United States Patent
Aanderud et al.

(10) Patent No.: US 12,477,583 B2
(45) Date of Patent: Nov. 18, 2025

(54) ALIASING FOR CELL-BASED MANET

(71) Applicant: Rockwell Collins, Inc., Cedar Rapids, IA (US)

(72) Inventors: Brian L. Aanderud, Eden Prairie, MN (US); Stephen M. Clark, Evansdale, IA (US); Tj T. Kwon, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 659 days.

(21) Appl. No.: 17/846,625

(22) Filed: Jun. 22, 2022

(65) Prior Publication Data

US 2023/0422307 A1    Dec. 28, 2023

(51) Int. Cl.
*H04W 74/08* (2024.01)
*H04W 48/20* (2009.01)
*H04W 74/00* (2009.01)
*H04W 74/0833* (2024.01)

(52) U.S. Cl.
CPC ....... *H04W 74/0833* (2013.01); *H04W 48/20* (2013.01); *H04W 74/006* (2013.01)

(58) Field of Classification Search
CPC .......... H04W 74/0833; H04W 48/20; H04W 74/006
See application file for complete search history.

(56) References Cited

U.S. PATENT DOCUMENTS

| | | |
|---|---|---|
| 4,134,113 A | 1/1979 | Powell |
| 4,399,531 A | 8/1983 | Grande et al. |
| 4,438,439 A | 3/1984 | Shreve |
| 4,806,934 A | 2/1989 | Magoon |
| 5,706,010 A | 1/1998 | Franke |
| 5,835,482 A | 11/1998 | Allen |
| 5,898,902 A | 4/1999 | Tuzov |
| 6,072,425 A | 6/2000 | Vopat |
| 6,111,541 A | 8/2000 | Karmel |

(Continued)

FOREIGN PATENT DOCUMENTS

| | | |
|---|---|---|
| CN | 101330448 A | 12/2008 |
| CN | 101465793 A | 6/2009 |

(Continued)

OTHER PUBLICATIONS

Turgut D. et al: "Optimizing clustering algorithm in mobile ad hoc networks using simulated annealing", vol. 3, Mar. 16, 20023, pp. 1492-1497.

(Continued)

*Primary Examiner* — Gbemileke J Onamuti
(74) *Attorney, Agent, or Firm* — Suiter Swantz IP (57) ABSTRACT

A communication system and method for joining a first cell in a network is disclosed. The system includes a plurality of nodes with one node configured as a base station and one or more nodes of the plurality of nodes configured as user equipment. Aliased resource allocation messages are used to send scheduling information to the user equipment, for which proper aliases must be determined. To ensure that proper aliasing is utilized, the base station and user equipment determine that the alias is unique. The base station may also recommend an alias with a smaller bit size. The communication system may also include a second cell that shares user equipment with the first cell, with each shared user equipment having a cell-specific alias.

20 Claims, 7 Drawing Sheets

(56) References Cited

U.S. PATENT DOCUMENTS

| | | |
|---|---|---|
| 6,115,394 A | 9/2000 | Balachandran et al. |
| 6,148,219 A | 11/2000 | Engelbrecht et al. |
| 6,195,403 B1 | 2/2001 | Anderson et al. |
| 6,415,154 B1 | 7/2002 | Wang et al. |
| 6,496,940 B1 | 12/2002 | Horst et al. |
| 6,611,773 B2 | 8/2003 | Przydatek et al. |
| 6,662,229 B2 | 12/2003 | Passman et al. |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,299,013 B2 | 11/2007 | Rotta et al. |
| 7,313,401 B2 | 12/2007 | Karmel |
| 7,417,948 B2 | 8/2008 | Sjöblom |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,636,061 B1 | 12/2009 | Thomas et al. |
| 7,679,551 B2 | 3/2010 | Petovello et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,036,224 B2 | 10/2011 | Axelsson et al. |
| 8,121,741 B2 | 2/2012 | Taft et al. |
| 8,138,626 B2 | 3/2012 | Jonsson et al. |
| 8,159,954 B2 | 4/2012 | Larsson et al. |
| 8,217,836 B1 | 7/2012 | Anderson et al. |
| 8,218,550 B2 | 7/2012 | Axelsson et al. |
| 8,223,660 B2 | 7/2012 | Allan et al. |
| 8,223,868 B2 | 7/2012 | Lee |
| 8,341,289 B2 | 12/2012 | Hellhake et al. |
| 8,396,686 B2 | 3/2013 | Song et al. |
| 8,490,175 B2 | 7/2013 | Barton et al. |
| 8,553,560 B2 | 10/2013 | Axelsson et al. |
| 8,587,770 B1 | 11/2013 | Johnston et al. |
| 8,630,291 B2 | 1/2014 | Shaffer et al. |
| 8,638,008 B2 | 1/2014 | Baldwin et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,849,596 B2 | 9/2014 | Ting et al. |
| 8,867,427 B2 | 10/2014 | Taori et al. |
| 8,913,543 B2 | 12/2014 | Zainaldin |
| 8,942,197 B2 | 1/2015 | Rudnick et al. |
| 8,964,739 B1 | 2/2015 | Wisehart |
| 8,989,326 B2 | 3/2015 | An et al. |
| 9,179,475 B2 | 11/2015 | Koleszar et al. |
| 9,213,387 B2 | 12/2015 | King et al. |
| 9,246,795 B2 | 1/2016 | Madaiah et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,345,029 B2 | 5/2016 | Monte et al. |
| 9,435,884 B2 | 9/2016 | Inoue |
| 9,516,513 B2 | 12/2016 | Saegrov et al. |
| 9,544,162 B2 | 1/2017 | Vasseur et al. |
| 9,628,285 B2 | 4/2017 | Császár |
| 9,713,061 B2 | 7/2017 | Ruiz et al. |
| 9,719,803 B2 | 8/2017 | Ratcliff et al. |
| 9,858,822 B1 | 1/2018 | Gentry |
| 9,979,635 B2 | 5/2018 | Hellhake et al. |
| 10,067,199 B2 | 9/2018 | Eldridge et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,236,648 B2 | 3/2019 | Irons et al. |
| 10,257,655 B2 | 4/2019 | Cody |
| 10,382,897 B1 | 8/2019 | Lanes et al. |
| 10,455,521 B2 | 10/2019 | Hudson et al. |
| 10,459,074 B1 | 10/2019 | Omer et al. |
| 10,484,837 B2 | 11/2019 | Navalekar et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,785,672 B2 | 9/2020 | Kwan et al. |
| 10,798,053 B2 | 10/2020 | Nolan et al. |
| 10,873,429 B1 | 12/2020 | Kwon et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,082,324 B2 | 8/2021 | Ramanathan et al. |
| 11,129,078 B2 | 9/2021 | Yates et al. |
| 11,138,044 B2 | 10/2021 | Boehm et al. |
| 11,258,520 B2 | 2/2022 | Goergen et al. |
| 11,280,911 B2 | 3/2022 | Kennedy et al. |
| 11,284,295 B1 | 3/2022 | Kwon et al. |
| 11,290,942 B2 | 3/2022 | Kwon et al. |
| 11,500,111 B2 | 11/2022 | Frederiksen et al. |
| 11,528,675 B2 | 12/2022 | Nagaraja et al. |
| 11,977,173 B2 | 5/2024 | Loren et al. |
| 12,050,279 B2 | 7/2024 | Stevens et al. |
| 12,078,732 B1 | 9/2024 | Sirianni et al. |
| 12,111,406 B2 | 10/2024 | Sorsby et al. |
| 2002/0018448 A1 | 2/2002 | Amis et al. |
| 2002/0082024 A1 | 6/2002 | Bajikar |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0032363 A1 | 2/2004 | Schantz et al. |
| 2004/0123228 A1 | 6/2004 | Kikuchi et al. |
| 2004/0192334 A1 | 9/2004 | McBurney et al. |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2005/0033789 A1 | 2/2005 | Sirois |
| 2005/0047347 A1 | 3/2005 | Lee et al. |
| 2005/0141545 A1 | 6/2005 | Fein et al. |
| 2005/0219950 A1 | 10/2005 | Rowe |
| 2005/0272379 A1 | 12/2005 | Rotta et al. |
| 2006/0010170 A1 | 1/2006 | Lashley et al. |
| 2006/0056421 A1 | 3/2006 | Zaki |
| 2006/0176847 A1 | 8/2006 | Chen et al. |
| 2007/0021122 A1 | 1/2007 | Lane et al. |
| 2007/0086541 A1 | 4/2007 | Moon et al. |
| 2007/0097880 A1 | 5/2007 | Rajsic |
| 2007/0109979 A1 | 5/2007 | Fu et al. |
| 2007/0222665 A1 | 9/2007 | Koeneman |
| 2007/0223497 A1 | 9/2007 | Elson et al. |
| 2007/0299950 A1 | 12/2007 | Kulkarni |
| 2008/0068250 A1 | 3/2008 | Brandao et al. |
| 2008/0107034 A1 | 5/2008 | Jetcheva et al. |
| 2008/0117904 A1 | 5/2008 | Radha et al. |
| 2008/0158040 A1 | 7/2008 | Stayton et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2009/0086713 A1 | 4/2009 | Luo |
| 2009/0203337 A1 | 8/2009 | Sisley et al. |
| 2009/0207694 A1 | 8/2009 | Guigne et al. |
| 2009/0233544 A1 | 9/2009 | Oyman et al. |
| 2009/0290572 A1 | 11/2009 | Gonia et al. |
| 2009/0303115 A1 | 12/2009 | Alizadeh-Shabdiz |
| 2010/0074101 A1 | 3/2010 | Skalecki et al. |
| 2010/0074141 A1 | 3/2010 | Nguyen |
| 2010/0111065 A1 | 5/2010 | Noh et al. |
| 2010/0226450 A1 | 9/2010 | Tanaka |
| 2010/0246660 A1 | 9/2010 | Matsuo et al. |
| 2011/0006913 A1 | 1/2011 | Chen et al. |
| 2011/0013487 A1 | 1/2011 | Zhou et al. |
| 2011/0053494 A1 | 3/2011 | Kobayakawa |

(56) References Cited

U.S. PATENT DOCUMENTS

| | | |
|---|---|---|
| 2011/0169684 A1 | 7/2011 | Margolin |
| 2011/0188378 A1 | 8/2011 | Collins et al. |
| 2011/0312279 A1 | 12/2011 | Tsai et al. |
| 2012/0092208 A1 | 4/2012 | LeMire et al. |
| 2012/0098699 A1 | 4/2012 | Calmettes et al. |
| 2013/0006834 A1 | 1/2013 | Waelbroeck et al. |
| 2013/0069834 A1 | 3/2013 | Duerksen |
| 2013/0094366 A1 | 4/2013 | Lee et al. |
| 2013/0100942 A1 | 4/2013 | Rudnick et al. |
| 2013/0130682 A1 | 5/2013 | Awad et al. |
| 2013/0195017 A1 | 8/2013 | Jamadagni et al. |
| 2013/0197835 A1 | 8/2013 | Jonsson et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2014/0340192 A1 | 11/2014 | Yamada et al. |
| 2015/0010153 A1 | 1/2015 | Robertson |
| 2015/0025818 A1 | 1/2015 | Das et al. |
| 2015/0071332 A1 | 3/2015 | Xu et al. |
| 2015/0222479 A1 | 8/2015 | Kim et al. |
| 2015/0296335 A1 | 10/2015 | Joshi et al. |
| 2015/0326689 A1 | 11/2015 | Leppänen et al. |
| 2015/0366470 A1 | 12/2015 | Kim et al. |
| 2016/0139241 A1 | 5/2016 | Holz et al. |
| 2016/0150465 A1 | 5/2016 | Jung et al. |
| 2016/0187458 A1 | 6/2016 | Shah et al. |
| 2016/0189381 A1 | 6/2016 | Rhoads |
| 2016/0265968 A1 | 9/2016 | Boutaud |
| 2016/0373997 A1 | 12/2016 | Petersen et al. |
| 2017/0111266 A1 | 4/2017 | Ko |
| 2017/0134227 A1 | 5/2017 | Song et al. |
| 2017/0149658 A1 | 5/2017 | Rimhagen et al. |
| 2017/0168163 A1 | 6/2017 | Small |
| 2017/0366223 A1 | 12/2017 | Stofer et al. |
| 2018/0013665 A1 | 1/2018 | Ko et al. |
| 2018/0026475 A1 | 1/2018 | Gelonese et al. |
| 2018/0098263 A1 | 4/2018 | Luo et al. |
| 2018/0146489 A1 | 5/2018 | Jin et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0317207 A1 | 10/2019 | Schroder et al. |
| 2019/0332067 A1 | 10/2019 | Zhao et al. |
| 2019/0349172 A1 | 11/2019 | Zhang |
| 2020/0011968 A1 | 1/2020 | Hammes et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0292706 A1 | 9/2020 | Hexsel et al. |
| 2020/0350983 A1 | 11/2020 | Alasti et al. |
| 2020/0371247 A1 | 11/2020 | Marmet |
| 2020/0396708 A1 | 12/2020 | Bharadwaj et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2021/0302956 A1 | 9/2021 | Sudhakaran et al. |
| 2021/0359752 A1 | 11/2021 | Wang et al. |
| 2021/0385879 A1 | 12/2021 | Mahalingam et al. |
| 2022/0030511 A1 | 1/2022 | Wang et al. |
| 2022/0038139 A1 | 2/2022 | Löwenmark et al. |
| 2022/0060959 A1 | 2/2022 | Atungsiri et al. |
| 2022/0069901 A1 | 3/2022 | Tian et al. |
| 2022/0085892 A1 | 3/2022 | Sorge |
| 2022/0086818 A1 | 3/2022 | Nam et al. |
| 2022/0094634 A1 | 3/2022 | Kwon et al. |
| 2022/0143428 A1 | 5/2022 | Goetz et al. |
| 2022/0159741 A1 | 5/2022 | Hoang et al. |
| 2022/0173799 A1 | 6/2022 | Wigard et al. |
| 2022/0198351 A1 | 6/2022 | Beaurepaire et al. |
| 2022/0295492 A1 | 9/2022 | Shattil |
| 2022/0360320 A1 | 11/2022 | Miao et al. |
| 2022/0368410 A1 | 11/2022 | Ma et al. |
| 2023/0057666 A1 | 2/2023 | Kwon et al. |
| 2023/0111316 A1 | 4/2023 | Ma et al. |
| 2023/0118153 A1 | 4/2023 | Amorim et al. |
| 2023/0133633 A1 | 5/2023 | Park et al. |
| 2023/0135149 A1 | 5/2023 | Krishnamurthy et al. |
| 2023/0280435 A1 | 9/2023 | Schatz et al. |
| 2023/0280436 A1 | 9/2023 | Loren et al. |
| 2023/0280437 A1 | 9/2023 | Kwon et al. |
| 2023/0288518 A1 | 9/2023 | Graf et al. |
| 2023/0288519 A1 | 9/2023 | Schatz et al. |
| 2023/0288521 A1 | 9/2023 | Kwon et al. |
| 2023/0296716 A1 | 9/2023 | Dean et al. |
| 2023/0379007 A1 | 11/2023 | Kwon et al. |
| 2023/0379008 A1 | 11/2023 | Sorsby et al. |
| 2023/0393229 A1 | 12/2023 | Loren et al. |
| 2024/0151800 A1 | 5/2024 | Stevens et al. |

FOREIGN PATENT DOCUMENTS

| | | |
|---|---|---|
| CN | 101330448 B | 12/2010 |
| CN | 101465793 B | 2/2011 |
| CN | 101686179 B | 1/2013 |
| CN | 103067286 B | 6/2016 |
| CN | 107645417 A | 1/2018 |
| CN | 110234147 A | 9/2019 |
| CN | 115085799 A | 9/2022 |
| DE | 102010010935 A1 | 9/2011 |
| EP | 0908022 A2 | 4/1999 |
| EP | 1912392 A2 | 4/2008 |
| EP | 2208084 A4 | 11/2011 |
| EP | 2743726 A1 | 6/2014 |
| EP | 2466964 B1 | 12/2017 |
| EP | 3026961 B1 | 8/2020 |
| GB | 2542491 A | 3/2017 |
| GB | 2568122 B | 11/2019 |
| JP | 4290684 B2 | 7/2009 |
| JP | 5164157 B2 | 3/2013 |
| KR | 1020040107702 A | 12/2004 |
| KR | 100568976 B1 | 4/2006 |
| KR | 1020060078814 A | 7/2006 |
| KR | 101231707 B1 | 2/2013 |
| KR | 1020160071964 A | 6/2016 |
| WO | 2008157609 A3 | 3/2009 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |
| WO | 2019045767 A1 | 3/2019 |
| WO | 2020117427 A1 | 6/2020 |
| WO | 2020165627 A1 | 8/2020 |
| WO | 2020220233 A1 | 11/2020 |
| WO | 2021251902 A1 | 12/2021 |
| WO | 2022003386 A1 | 1/2022 |
| WO | 2022202858 A1 | 9/2022 |
| WO | 2022221429 | 10/2022 |
| WO | 2022232336 A1 | 11/2022 |
| WO | 2022233042 A1 | 11/2022 |
| WO | 2022233314 A1 | 11/2022 |
| WO | 2023001520 A1 | 1/2023 |
| WO | 2023030622 A1 | 3/2023 |
| WO | 2023047336 A1 | 3/2023 |
| WO | 2023057655 A1 | 4/2023 |
| WO | 2023067552 A1 | 4/2023 |
| WO | 2023068990 A1 | 4/2023 |
| WO | 2023081918 A1 | 5/2023 |

OTHER PUBLICATIONS

U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric J. Loren.

(56) References Cited

OTHER PUBLICATIONS

U.S. Appl. No. 63/344,445, filed May 20, 2022, Eric J. Loren.
U.S. Appl. No. 16/369,398, filed Mar. 29, 2019, Kwon.
U.S. Appl. No. 17/233,107, filed Apr. 16, 2022, Loren et al.
U.S. Appl. No. 17/541,703, filed Dec. 3, 2021, Kown et al.
U.S. Appl. No. 17/857,920, filed Jul. 5, 2022, Loren et al.
Peng Wang, et al., "Convergence of Satellite and Terrestrial Networks: A Comprehensive Survey networks" IEEEAcess; vol. 4, Dec. 31, 2019.
Pulak K. Chowdhury, et al. "Handover Schemes in Satellite Networks: State-of-the-Art and Future Research Directions" 4th Quarter 2006, vol. 8, No. 4, Oct. 1, 2006.
U.S. Appl. No. 17/233,107, filed Apr. 16, 2021, Eric J. Loren.
U.S. Appl. No. 16/987,671, filed Aug. 7, 2021, Kwon et al.
Extended Search Report for European Application No. 21188737.7 dated Dec. 10, 2021, 8 pages.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Martorella, M. et al., Ground Moving Target Imaging via SDAP-ISAR Processing: Review and New Trends. Sensors 2021, 21, 2391. https://doi.org/10.3390/s21072391.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf,org/html/drafts-yi-manet-pc-00, Nov. 14, 2001, 31 pages.

ALIASING FOR CELL-BASED MANET

BACKGROUND

Base stations in a cell-based mobile ad-hoc network (MANET) have access to exclusive channel resources. When a node, such as a mobile device, requests access to the cell within the MANET, the base station may accept the node into the cell, and then provide channel resources to the node, which requires cell resource scheduling. Cell resource scheduling may include sending a cell resource scheduling message, also known as a resource allocation message, to the node at least once every predetermined time period, or epoch, that includes relevant data for scheduling communications within the cell.

Beyond scheduling data, resource allocation messages also include identification data (e.g., an ID string) for each node of the cell. The ID string ensures that each node receives an allocated resource within the cell. The transmittal of long ID strings can be problematic during when the cell is performing in an adversarial (e.g., jamming) environment or other difficult environment, such as during a lightning storm, as there is a need for efficient and robust transmittal and reception. Therefore, there is a need for a system and method for modifying resource allocation message protocols to improve node-joining and node-to-node communication within a cell of an ad-hoc network over traditional methods.

SUMMARY

A method for joining a communication network comprising a first cell is disclosed. In one or more embodiments, the method includes monitoring a channel for a first pilot signal. In one or more embodiments, the method further includes determining the first pilot signal. In one or more embodiments, the method further includes determining a first base station associated with the first pilot signal. In one or more embodiments, the method further includes identifying a random-access channel procedure to communicate with the first base station. In one or more embodiments, the method further includes selecting a first proposed alias. In one or more embodiments, the method further includes transmitting a cell join request to the first base station via the random-access channel procedure for admittance into the first cell, wherein the join request comprises the first proposed alias. In one or more embodiments, the method further includes determining if the first proposed alias is acceptable via the first base station. In one or more embodiments, the method further includes receiving an admittance reply from the first base station, wherein the admittance reply is based on an acceptance of the first proposed alias or a recommended alias. In one or more embodiments, the method further includes receiving a resource allocation message that includes the first proposed alias or the recommended alias.

In some embodiments of the method, selecting the first proposed alias comprises examining in-use aliases within the first cell and selecting an alias that is not in-use.

In some embodiments of the method, the method further includes receiving a recommended alias reply from the first base station, wherein the recommended alias reply includes the recommended alias that is dissimilar to the proposed alias.

In some embodiments of the method determining if the first proposed alias is acceptable includes determining a number of bits required to transmit the first proposed alias and selecting the recommended alias requiring fewer bits to transmit than the proposed alias if aliases with a lower bit count are available.

In some embodiments of the method, determining if the first proposed alias is acceptable further includes comparing the first proposed alias to a set of aliases in-use within the first cell and determining that the first proposed alias is unique to the set of aliases in-use within the first cell.

In some embodiments of the method, the method further includes transmitting a resource management message, wherein the resource management message comprises an aliased identification element configured to identify the first proposed alias or the recommended alias.

In some embodiments of the method, the method further includes joining a second cell within the communication network. In some embodiments, joining a second cell within the communication network includes monitoring a channel for a second pilot signal for the second cell. In some embodiments, joining a second cell within the communication network further includes receiving the second pilot signal. In some embodiments, joining a second cell within the communication network further includes identifying a second base station associated with the first pilot signal. In some embodiments, joining a second cell within the communication network further includes identifying the random-access channel procedure to communicate with the second base station. In some embodiments, joining a second cell within the communication network further includes selecting a second proposed alias. In some embodiments, joining a second cell within the communication network further includes transmitting a cell join request to the second base station via the random-access channel procedure for admittance into the second cell, wherein the cell join request comprises the second proposed alias. In some embodiments, joining a second cell within the communication network further includes determining if the second proposed alias is acceptable via the second base station. In some embodiments, joining a second cell within the communication network further includes receiving an admittance reply from the second base station. In some embodiments, joining a second cell within the communication network further includes receiving a resource allocation message that includes the second proposed alias.

In some embodiments of the method, joining a second cell within the communication network further includes transmitting a second resource management message, wherein the second resource management message comprises an aliased identification element configured to identify the first proposed alias, and the second proposed alias or the recommended alias.

In some embodiments of the method, the method further includes transmitting an initial resource allocation message, receiving the cell join request, and transmitting the admittance reply.

A communication system is also disclosed. In some embodiments, the communication system includes a plurality of communication nodes, wherein a first set of the plurality of communication nodes are arranged in a first cell containing one communication node configured as a base station and at least one communication node configured as a user equipment. In one or more embodiments, the user equipment includes a first transmitter, a first receiver, and one of more first processors. In one or more embodiments, the user equipment further includes a first memory communicatively coupled to the one or more first processors and having instructions stored upon that are executed by the one or more first processors. In one or more embodiments, the instructions include monitoring a channel for a first pilot signal. In one or more embodiments, the instructions further include determining a first pilot signal. In one or more embodiments, the instructions further include determining a first base station associated with the first pilot signal. In one or more embodiments, the instructions further include identifying a random-access channel procedure to communicate with the first base station. In one or more embodiments, the instructions further include selecting a first proposed alias. In one or more embodiments, the instructions further include transmitting a cell join request to the first base station via the random-access channel procedure for admittance into the first cell, wherein the join request comprises the first proposed alias. In one or more embodiments, the instructions further include receiving an admittance reply from the first base station, wherein the admittance reply is based on an acceptance of the first proposed alias or a recommended alias. In one or more embodiments, the instructions further include transmitting a signal via a resource of a cell joining procedure.

In some embodiments of the system, the base station includes a second transmitter, a second receiver, and one or more second processors. In some embodiments, the base station further includes a second memory communicatively coupled to the one or more second processors and having instructions stored upon, that are executed by the one or more second processors. In some embodiments, the instructions include determining at least one of an absence of a second pilot signal or absence of a second base station. In some embodiments, the instructions further include designating a node as a second base station. In some embodiments, the instructions further include receiving a cell join request. In some embodiments, the instructions further include determining if the first proposed alias is acceptable. In some embodiments, the instructions further include transmitting the admittance reply.

In some embodiments of the system, selecting the first proposed alias includes examining in-use aliases within the first cell and selecting the first proposed alias that is not in-use.

In some embodiments of the system, the determination that the first proposed alias is acceptable includes comparing the first proposed alias to the other aliases in-use within the first cell and determining that the first proposed alias is unique to the other aliases in-use within the first cell.

In some embodiments of the system, the instructions further instruct the second one or more processors to maintain an alias table.

In some embodiments of the system, the determination of the first proposed alias as acceptable comprises determining the number of bits required to transmit the proposed alias; and selecting a recommended alias requiring fewer bits to transmit than the proposed alias if aliases with a lower bit count are available.

In some embodiments of the system, the plurality of communication nodes comprises a second set of communication nodes arranged in a second cell containing a second base station, wherein the second cell includes at least one shared user equipment from the first cell, the shared user equipment configured with a second alias specific for the second cell.

In some embodiments of the system, at least one shared user equipment is configured to transmit a resource management message comprising an alias element. configured to identify the first proposed alias or a second alias, and a cell identification element configured to identify the first cell or the second cell.

In some embodiments of the system, the instructions stored upon the second memory further instruct the second one or more processors to, upon two or more user equipment selecting the same alias, to refuse to admit the two or more-user equipment; and report a random-access channel collision in a subsequent resource allocation message.

A method for joining an ad hoc communication network comprising a first cell is also disclosed. In one or more embodiments, the method includes selecting a first proposed alias. In one or more embodiments, the method further includes transmitting a cell join request to the first base station via the random-access channel procedure for admittance into the first cell, wherein the join request comprises the first proposed alias. In one or more embodiments, the method further includes determining if the first proposed alias is acceptable via the base station. In one or more embodiments, the method further includes receiving an admittance reply from the first base station, wherein the admittance replay is based on an acceptance of the first proposed alias or a recommended alias. In one or more embodiments, the method further includes receiving a resource allocation message that includes the alias.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1 b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system and method for operating a cell within an ad-hoc network is disclosed. In particular, the system and method include protocols for cell-joining into a call that include the designation of a cell-specific alias for a node and an incorporation of the alias into a resource allocation message. Both the incoming node and the base station may work to determine an appropriate alias, which may be optimized with a lower bit number. The system and method permit a single node to participate in different cells, with different aliases specific to each cell. The use of cell-specific aliases with a lower bit number reduces the length of the resource allocation message, increasing transmit efficiency and reducing the probability of message interruption due to natural or adversarial interference.

Figure 1:
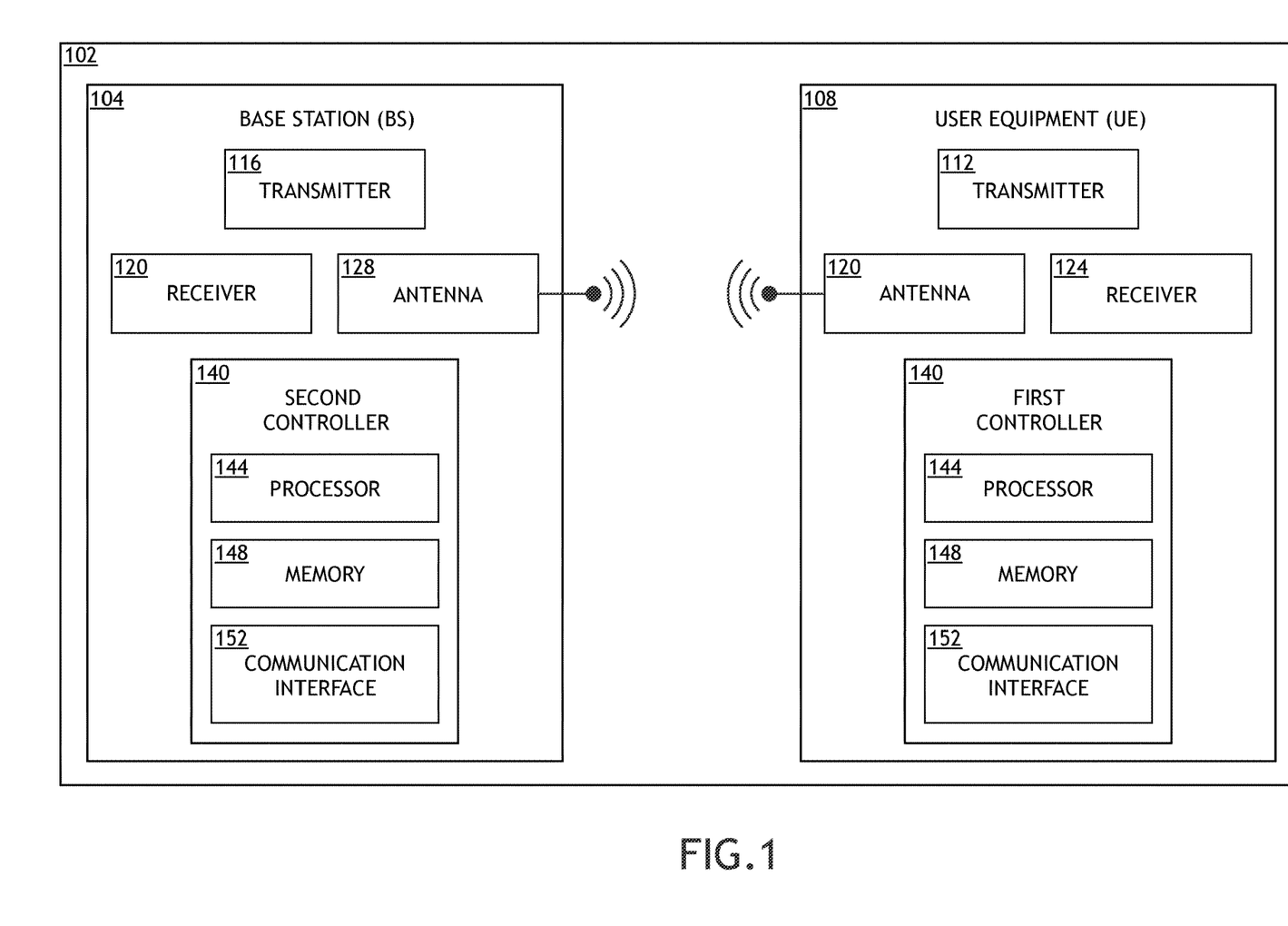
FIG. 1 is a block diagram of a communication system 10 that includes a set of nodes, with at least one node configured as a base station, and one or more nodes configured as user equipment, in accordance with one or more embodiments of the disclosure.

FIG. 1 is a block diagram of a communication system 100 that includes a set (e.g., cell 102) of nodes, with at least one node configured as a base station 104, and one or more nodes configured as user equipment 108, in accordance with one or more embodiments of the disclosure. The communication system 100 may be configured as a network of nodes that includes the cell 102, and may include other nodes and cells 102. For example, the cell 102 may include a geographically- or functionally-linked set of nodes within a network.

The communication system 100 may include any type of wireless or wireline network, and may include either a centralized of decentralized (e.g., ad hoc) network. For example, the communication system 100 may be configured as a wireless ad hoc network. For instance, the communication system may be configured as a mobile at hoc network (MANET) or a vehicular ad hoc network (VANET). The communication system 100 may include nodes arranged in any type of network topology including but not limited to a mesh topology, a star topology, a tree topology, a bus topology, a ring topology, or a hybrid topology. For example, the communication system 100 may be configured as a MANET that utilized a mesh topology.

The nodes within the communication system 100 may all have similar functionalities and capabilities, or may have different functionalities and capabilities. For example, the communication system 100 may include similar nodes than may each be configured to either the role of the base station 104 or the user equipment 108. In another example, the communication system 100 may include nodes that are specifically configured for use as a base station 104 and nodes that are specifically configured as user equipment 108. Nodes configured as user equipment 108 may include any type of equipment that may be used for communication (e.g., wireless communication) including but not limited to a mobile device (e.g., cell phone, tablet), a radio, or any other device with transmission and reception capabilities.

The communication system 100 may be configured for communication between nodes via any type of communication method including but not limited to channel access methods or multiple access methods including but not limited to frequency-division multiple access (FDMA), time-division multiple access (TDMA), code-division multiple access (CDMA) space-division multiple access (SDMA), power division multiple access (PDMA), packet mode methods, and duplexing methods such as time-division duplex (TDD) or frequency-division duplex FDD, and spread spectrum. For example, the communication system 100 be configured for communication between nodes via a TDMA method, utilizing frames and slots.

The user equipment 108 and the base station 104 may include a transmitter 112, 116 (e.g., a first transmitter 112 and a second transmitter 116, respectively) and a receiver 120, 124 (e.g., a first receiver 120 and a second receiver 124, respectively), which may be configured as a transceiver. The user equipment 108 and the base station 104 each include a respective antenna 128, 132 (e.g., a first antenna 128 and a second antenna 132), and respective controllers 136, 140 (e.g., a first controller 136 and a second controller 140) communicatively coupled to the respective transmitters 112, 116 and receivers 124, 120 and configured to perform the functionality of the base station 104 and the user equipment 108 as described herein. The first controller 136 and the second controller 140 each contain one or more processors 144, a memory 148, and a communication interface 152.

The one or more processors 144 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 144 may include any device configured to execute algorithms and/or instructions (e.g., program instructions stored in memory 148). In one embodiment, the one or more processors 144 may be embodied as mobile phone, tablet, radio, laptop computer, networked computer, or any other computer system configured to execute a program configured to operate a node (e.g., base station 104 or user equipment 108 and/or components of the communication system 100, as described throughout the present disclosure. Moreover, different subsystems of the nose may include a processor or logic elements suitable for carrying out at least a portion of the steps described in the present disclosure. Therefore, the above description should not be interpreted as a limitation on the embodiments of the present disclosure but merely as an illustration.

The memory 148 may include any storage medium known in the art suitable for storing the one or more sets of program instructions executable by the associated one or more processors 144. For example, the memory 148 may include a non-transitory memory medium. For instance, the memory 148 may include, but is not limited to, a read-only memory (ROM), a random-access memory (RAM), a magnetic or optical memory device (e.g., disk), a magnetic tape, a solid-state drive, and the like. The memory 148 may be configured to provide information to the controllers 136, 140, the transmitters 112, 116, the receivers 120, 124, or other components of the base station 104 and user equipment 108. In addition, the memory 148 may be configured to store user input. The memory 148 may be housed in a common controller housing with the one or more processors 144. The memory 148 may, alternatively or in addition, be located remotely with respect to the spatial location of the processors 144, or the one or more controllers 136, 140. For example, the one or more processors 144 and/or one or more controllers 136, 140 may access a remote memory 148 accessible through a network (e.g., wireless, and the like) via one or more communication interfaces 152.

The one or more communication interfaces 152 may be operatively configured to communicate with components of the one or more controllers 136, 140 or any other componentry within the communication system 100. For example, the one or more communication interfaces 152 may be configured to retrieve data from the one or more processors 144 or other devices, transmit data for storage in the memory 148, retrieve data from storage in the memory 148, and so forth. The one or more communication interfaces 152 may also be communicatively coupled with the one or more processors 144 to facilitate data transfer between components of the one or more controllers 136, 140 and the one or more processors 144. It should be noted that while the one or more communication interfaces 152 is described as a component of the one or more controllers 136, 140, one or more components of the one or more communication interfaces 152 may be implemented as external components communicatively coupled to the one or more controllers 136, 140 via a wired and/or wireless connection. The one or more controllers 136, 140 may also include and/or connect to one or more user interfaces.

Figure 2:
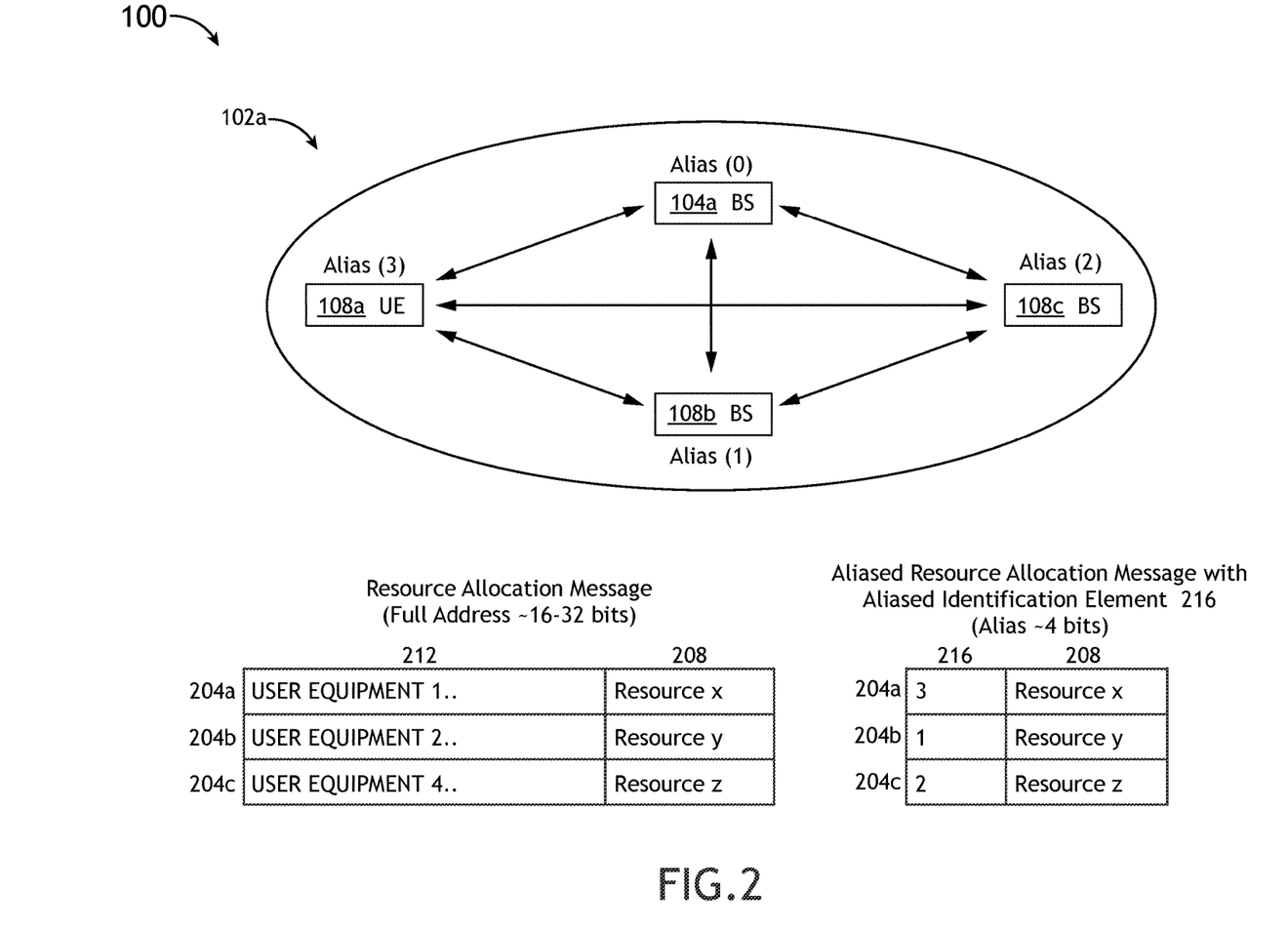
FIG. 2 is a diagram illustrating a communication system containing a single cell, in accordance with one or more embodiments of the disclosure.

FIG. 2 is a diagram of a first cell 102a of the communication system 100, in accordance with one or more embodiments of the disclosure. The first cell 102 includes a first base station 104a and three user equipment 100a-c that can communicate with the first base station 104a and to each other. The base station 104 performs cell maintenance functions in a centralized manner, such as to manage resource allocation and route calculations. The base station 104 disseminates this information to the user equipment via a resource allocation message 204a-c. A unique resource allocation message 204 is sent for each user equipment 108a-c in the first cell 102a, which is sent over to at least once every epoch.

The timing of each epoch for the communication system 100 may be defined by any set of definitions. For example, the epoch be defined by the timing of one frame of a TDMA frame, one or more slots of a TDMA frame, a predetermined time period (e.g., every millisecond or every 100 milliseconds), or defined by a change in the spatial or functional organization of the communication system. For example, an epoch may last until a user equipment 108a-c joins or leaves the first cell 102a. In another example, the epoch may last until a user equipment 108a-c moves a predetermined distance from the base station 104a (e.g., greater than 5 km).

The resource allocation message 204a-c includes a payload containing scheduling data, routing data, and/or other data required for maintaining communication for the user equipment 108 within the first cell 102a. The resource allocation message 204a-c also includes an identification element 212 that identifies which user equipment 108a-c that the resource allocation message is specific for. For example, resource allocation message 204a is specific for user equipment 108a. In current systems, the identification element 212 includes identification information (e.g., address information or other node-identifying information of the user equipment 108a-c) which typically uses 16 bits, 32 bits, or more bits of information.

The use of 16 bits, 32 bits, or more bits per identification element 212 may not be an efficient use of messaging, particularly for cells 102 of communication systems that are relatively small in node number. For example, a communication system 100 that includes 50,000 nodes or user equipment 108, each requiring a distinct identification element 212, would need at least 16 bits for each identification element 212. For instance, the element number of the 50,000$^{th}$ node may be given the 16$^{th}$ binary digit node identification number of 1100001101010000 (e.g., binary for 50,000). Other descriptive information may also be included within the identification element, lengthening the identification element further.

In some embodiments, the resource allocation message 204 includes an aliased identification element 216. For example, the user equipment 108a-c that within a specific cell (e.g., a first cell 102a) may each have a specific aliased identification element 216a-c that is used when the user equipment 108a-c is being used for communication within the cell 102. For instance, and as shown in FIG. 2, the base station 104a may send resource allocation messages 204a-c to user equipment 108a-c, with aliased identification elements of "3", "1", and "2", respectively. The base station 104a may also have an alias of "0". These aliases reduce the message space and transmitter time of the identification element 212 considerably, with the number of bits used potentially shortened to the number of bits required for the node with the largest alias. For example, an alias of three requires only two bits in binary "11".

Figure 3:
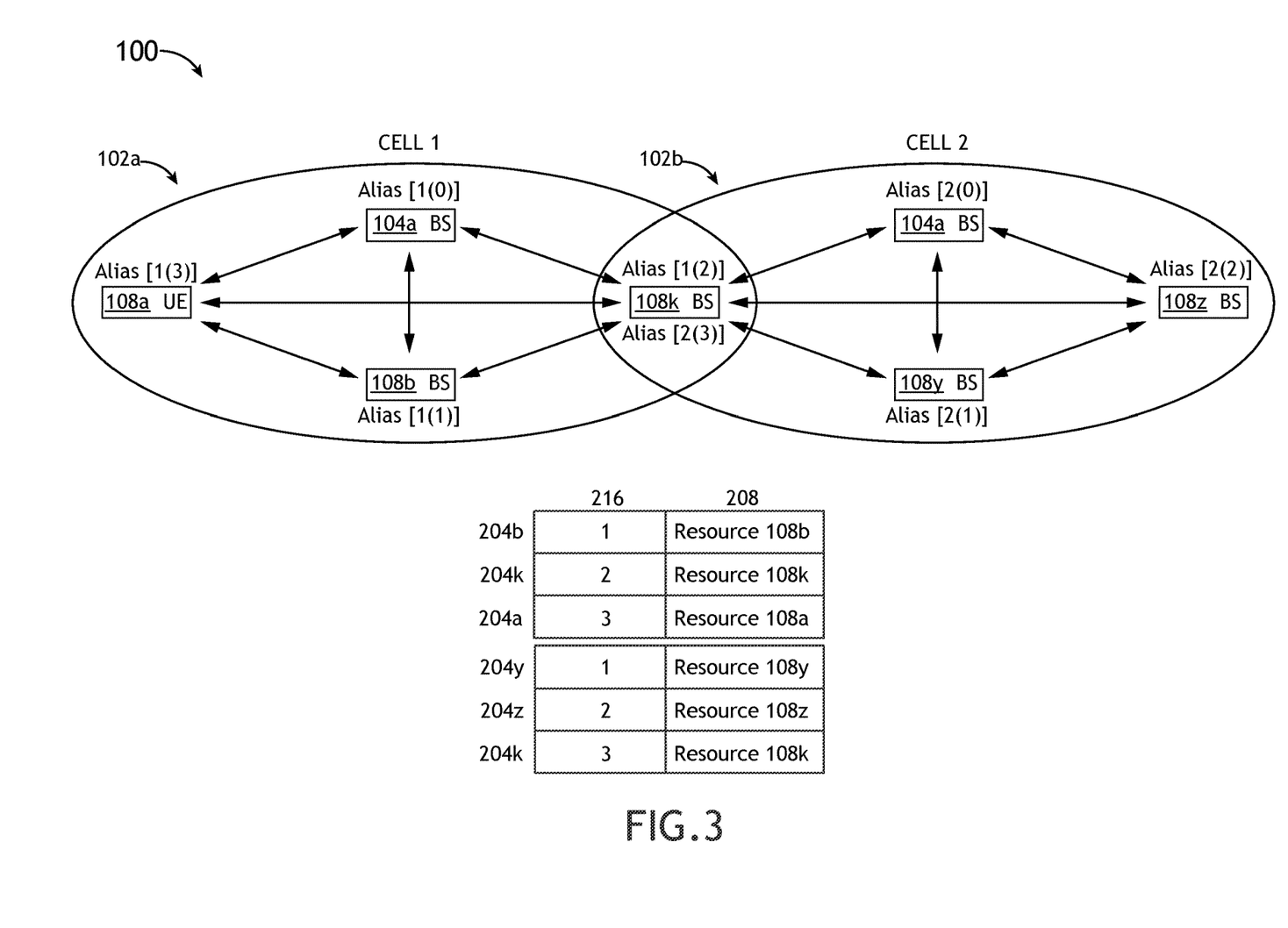
FIG. 3 is a diagram illustrating a communication system containing two cells, in accordance with one or more embodiments of the disclosure.

The use of aliases in identification elements 212 may be extended to communication systems 100 with multiple cells 102, and multiple cells 102 that share user equipment 108, as shown in FIG. 3, in accordance with one or more embodiments of the disclosure. As the resource allocation for a node (e.g., user equipment 108) is cell-specific, user equipment 108 that participate in multiple cells 102 are required to have resource allocations from each cell 102 that the user equipment 108 is participating. For example, the communication system 100 may include both a first cell 102a with user equipment 108a-b, and a second cell 1-2b with user equipment 100y-z. The first cell 102a and the second cell 102b may share a user equipment 100k. The first cell 102a and the second cell 102b both include a payload

208 and utilize the aliased identification element 216, where an alias is given that is cell-specific. To discern resource allocation messages from different base stations 104*a-b*, a single ID or alias of the base station 104*a-b* is typically sufficient.

In some embodiments, the resource allocation message 204 may also include a cell element, containing a cell ID or cell alias, that is incorporated into the identification element 212, 216 or elsewhere, that indicates the specific cell that the user equipment 108 is operating under. For example, user equipment 108 *a-b, k* operating under the first cell 102*a* may have a resource allocation message 204 that includes a value of "0" in the cell element, whereas the second cell 102*b* may have a resource allocation message 204 that includes a value of "1" in the cell element. User element 108*k*, being shared by the first cell 102*a* and the second cell 102*b*, is able to discern between the resource allocation messages 204 from different base stations 102*a-b* due to the cell element. Aliasing for resource allocation does not require a cell ID or cell-specific alias. However, by combining cell aliasing and node aliasing, a node can be uniquely identifiable, and may provide a solution for global aliasing.

It should be understood that the communication system 100 may include any number of cells 102. For example, the communication system 100 may include more than 10 cells 102, may include more than 100 cells 102, may include more than 1000 cells 102, or may include more than 10,000 cells 102. Therefore, a single user equipment 108 may be shared within any number of cells 102. For example, a user equipment 108 may be configured to communicate with 10 different cells, with the user equipment configured with a cell-specific alias within each cell 102.

Figure 4A:
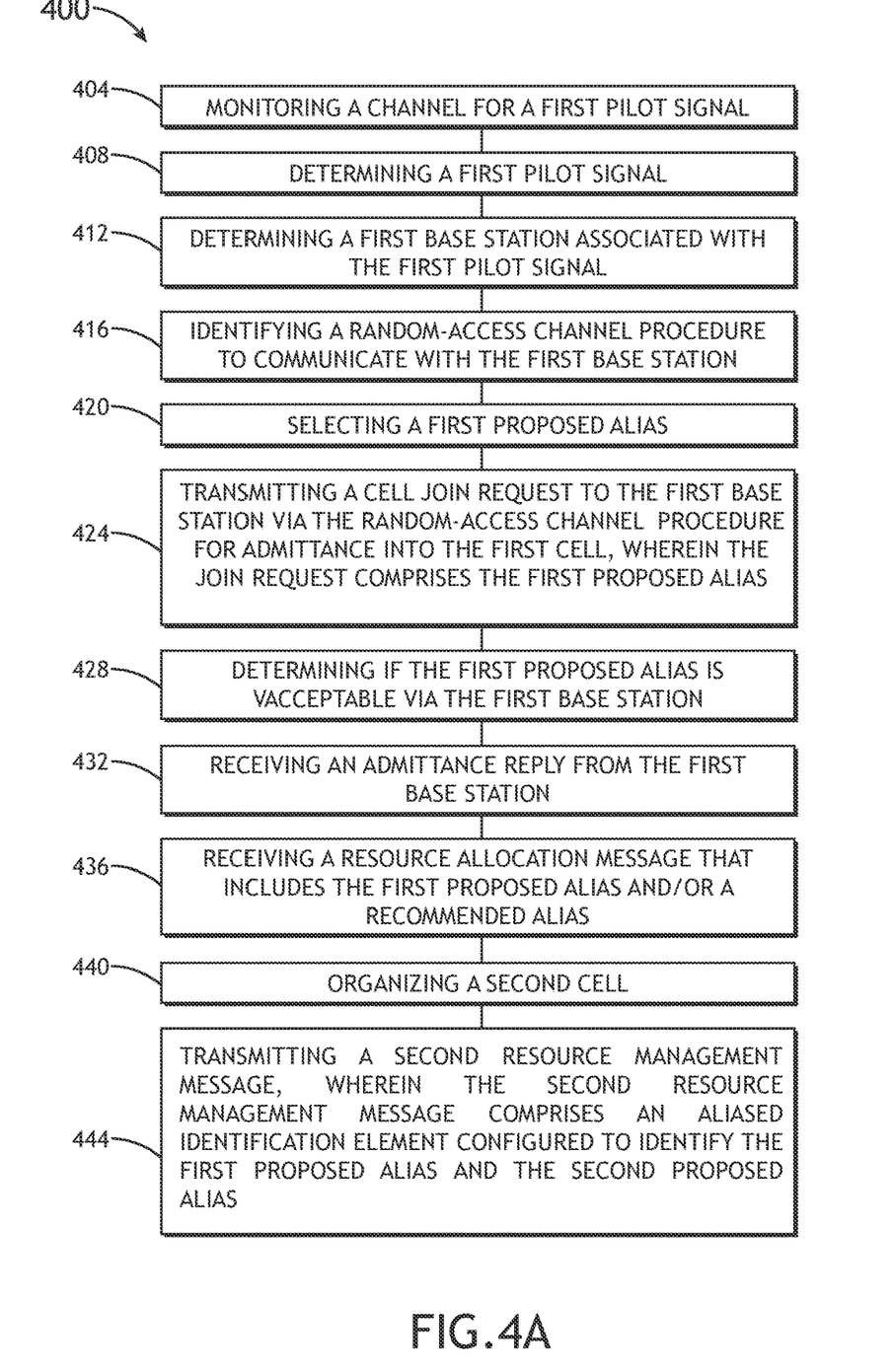
FIG. 4A is a flow diagram illustrating a method for joining/operating a cell, in accordance with one or more embodiments of the disclosure.

FIG. 4A is a flow chart illustrating a method 400 for joining/operating a cell 102 and selecting and incorporating of an alias into a resource management message 204, in accordance with one or more embodiments of the disclosure. The method may include either the selection/incorporation steps themselves, or the selection/incorporation steps along with the cell organization steps.

In some embodiments, the method 400 includes a step 404 of monitoring a channel for a first pilot signal. The first pilot signal may be configured as any signal that indicates to a node (e.g., user equipment 108 and/or base station 104), that the node should join or form a cell 102 within the communication system 100. For example, the first pilot signal may be configured as a resource allocation message 204. In another example, the first pilot message may include time slot scheduling. In another example, the first pilot message may include a base station ID. In another example, the first pilot message may include current utilization data, size of alias data, RACH information, and other additional information. The first pilot signal may be sent by a node configured as a base station 104, a user equipment 108, or any other communicative entity. The step 404 is also demonstrated at a point within the functional flowchart of FIG. 5A, in accordance with one or more embodiments of the disclosure.

In some embodiments, the method 400 further includes a step 408 of determining a first pilot signal. For example, the controller 140 may determine, based on input received by the transmitter 112, 116, that the node (e.g., which may have yet to be configured as a base station 104 or a user equipment 108) has detected the first pilot signal instructing the node to either initiate or join a cell 102. The step 404 is also demonstrated in FIG. 5A.

Figure 5A:
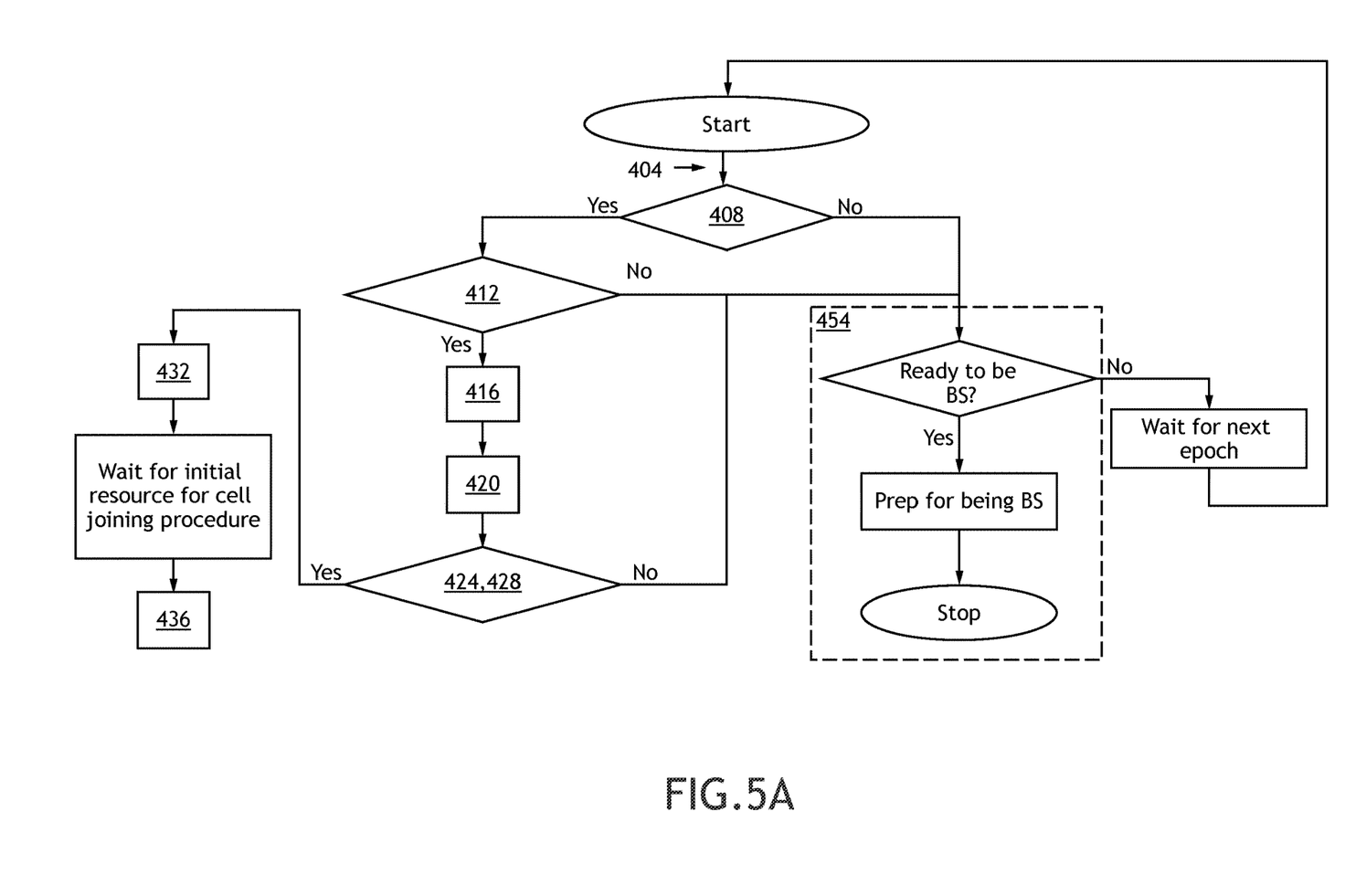
FIG. 5A is a flow diagram illustrating a method for joining/operating a cell, in accordance with one or more embodiments of the disclosure.

In some embodiments, the method 400 further includes the step 412 of determining a first base station 104*a* associated with the first pilot signal. For example, the node may determine that a base station 104, wherein the node would then be configured into a user equipment 108. In another example, the node may determine that a base station 104 does not exist, wherein the node may then assume the role of a base station 104. The decision-making of determining a first base station 104*a* is also depicted in FIG. 5A.

In some examples, the method 400 further includes the step 416 of identifying a random-access channel procedure (RACH) to communicate with the first base station 104*a*. A RACH is a transport-layer shared channel used by nodes to access mobile networks for call set-up and other data transmission aspects. For example, a user equipment 108 intending to communicate a signal would schedule a RACH. Since a RACH is shared between nodes, there is a probability that two or more nodes may transmit at the same time and that collide. These collisions are minimized by scheduling via the resource allocation messages 204 and aliasing protocols. The step 416 of identifying of a RACH is also depicted in FIG. 5A. It should be noted that RACH collisions can only be alleviated via random backoff, as joining nodes have not been allocated a resource.

In some embodiments, the method 400 further includes a step 420 of selecting a proposed alias. This step 420 may include selecting unused aliases (e.g., examining in-use aliases within the first cell and selecting a first proposed alias that is not in-use), which may occur during the process of a RACH procedure. For example, the user equipment 108 may select an unused alias based on received transmissions, such as previous first pilot signals or resource allocation messages 204. For instance, the user equipment 108 does not see any alias with greater than 6 bits, the user equipment may choose an unused alias 6-bits in length. The step 420 of selecting a proposed alias is also depicted in FIG. 5A.

In some embodiments, the method 400 further includes a step 424 of transmitting a cell join request to the first base station 104*a* via the RACH procedure for admittance into the first cell, wherein the join request comprises the first proposed alias (e.g., the alias selected by the user equipment 108 being the first proposed alias). For example, the user equipment 108 may, within a RACH procedure contention-based time slot for joining, send the selected alias (e.g., without the full ID of the user equipment 108 that would have been included in a traditional identification element 212 of a resource allocation message 204) to the first base station 104*a*.

In some embodiments, the method 400 further includes a step 428 of determining if the first proposed alias is acceptable via the base station 104*a*. For example, the first base station 104*a* may initially reject, or postpone, the acceptance of the user equipment 108 into the first cell 102*a* if the first proposed alias is not appropriate. For instance, the first proposed alias may be identical to another alias in the cell (e.g., the base station compares the first proposed aliases to other aliases in use). In another instance, the base station 104*a* may reject the first proposed alias as having an inappropriate length (e.g., too many bits, or possibly too few bits). In another example, the first base station 104*a* may decide to accept or reject the user equipment 108 based on available resources. The steps 424, 428 of transmitting a cell join request and determining if a first proposed alias is acceptable are also depicted in FIG. 5A.

In some embodiments, the method further includes a step 432 of receiving an admittance reply from the first base station 104, wherein the admittance reply is based on an acceptance of the first proposed alias or a recommended alias. For example, the first base station 104*a* may maintain an alias table that stores a complete list of aliases of the user equipment, as well as the full identification/identification address of the user equipment 108, for which these data, as well as timeout data, may be used to determine if the proposed alias is identical to another in-use alias. Upon receiving an admittance reply, the user equipment 108 can wait for an initial resource for implementing a cell joining procedure. The step 432 of receiving an admittance reply is also depicted in FIG. 5A. The method may further include a step 436 of receiving a resource allocation message that includes the first proposed alias and/or a recommended alias.

In some embodiments, the method 400 may include a step 438 of receiving a recommended alias reply from the first base station, wherein the recommended alias reply includes the recommended alias that is dissimilar to the proposed alias. For example, the first base station 104a may, after determining that the first proposed alias is unacceptable (e.g., identical to another alias or uses too many bits), may determine an acceptable recommended alias that is dissimilar to other aliases in-use and/or has an appropriate bit length. The first base station 104a may then send the recommended alias in to the user equipment 108 as a recommended alias reply message. Determining if a first proposed alias may also include determining the number of bits that are required to transmit the first proposed alias, wherein the recommended alias requiring fewer bits is selected if aliases with a lower bit count are available.

It should be understood that the number of bits in a recommended alias may be determined based on different sets of conditions. For example, the first base station 104a may select the number of required bits based on the smallest number of bits available that will still allow each user equipment 108 in the first cell 102a to have a unique alias. In another example, the first base station 104a may select the number of required bits based the best-fit prediction. For example, if the first cell 102a has 10 user equipment 108 (requiring four bits for an alias), is predicted to have a cell size between 10 and 18 user equipment 108, the first base station 104a may assign an alias of five bits (e.g., as required by a cell-size of 18 user equipment 108) to ensure that all user equipment 108 will have a unique alias. Using this same example, the first base station 104a may assign an alias of an even greater number of bits (e.g., 6-bits for 32 user equipment 108). further ensure that all user equipment 108 will have a unique node even if a larger number of user equipment 108 than predicted request admission into the first cell 102a.

In some embodiments, the method 400 includes a step 440 of joining a second cell 102b. For example, the second cell 102b may be organized with similar rules and organization as the first cell 102a, and may include user equipment 100k that overlaps with the first cell 102a, as shown in FIG. 3. The step 440 may include substeps similar to those steps already included in method 400 including but not limited to monitoring a channel for a second pilot signal for the second cell, receiving a second pilot signal, identifying a second base station associated with the second pilot signal, identifying a random-access channel procedure to communicate with the second base station, selecting a second proposed alias, transmitting a cell join request to the second base station via the random-access channel procedure for admittance into the second cell, wherein the join request comprises the second proposed alias, determining if the second proposed alias is acceptable via the second base station, receiving an admittance reply from the second base station; and receiving a resource allocation message that includes the second proposed alias.

In some embodiments, the method 400 includes a step 444 of transmitting a second resource management message, wherein the second resource management message comprises an aliased identification element 216 configured to identify the first proposed alias, the second proposed alias or the suggested alias. For example, and as shown in FIG. 3, the second resource management message for user equipment 108a includes the message payload 208 "Resource 108a", and the aliased identification element 216 "3".

Figure 4B:
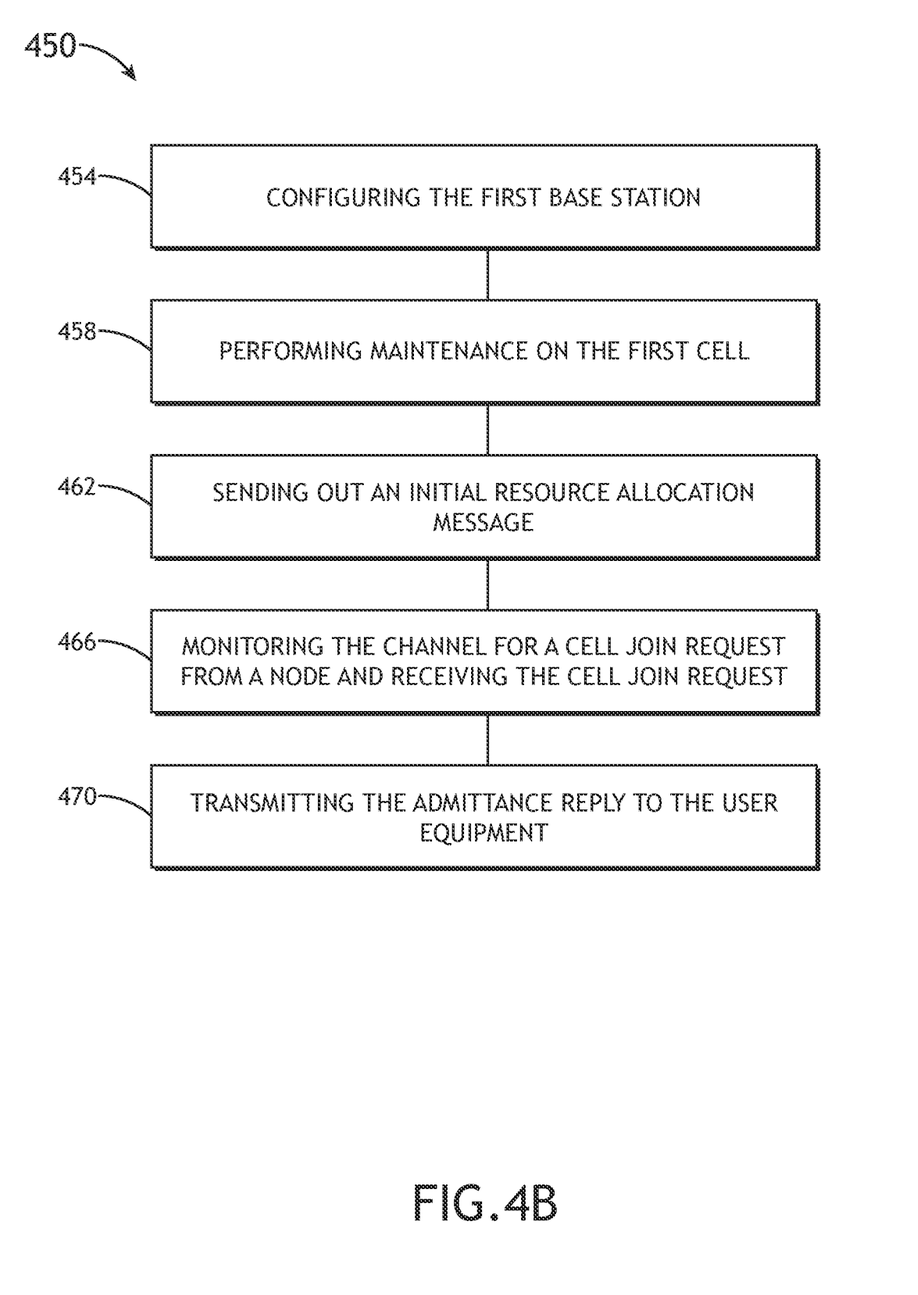
FIG. 4B is a flow diagram illustrating a method for maintaining the first base station of a first cell, in accordance with one or more embodiments of the disclosure.
Figure 5B:
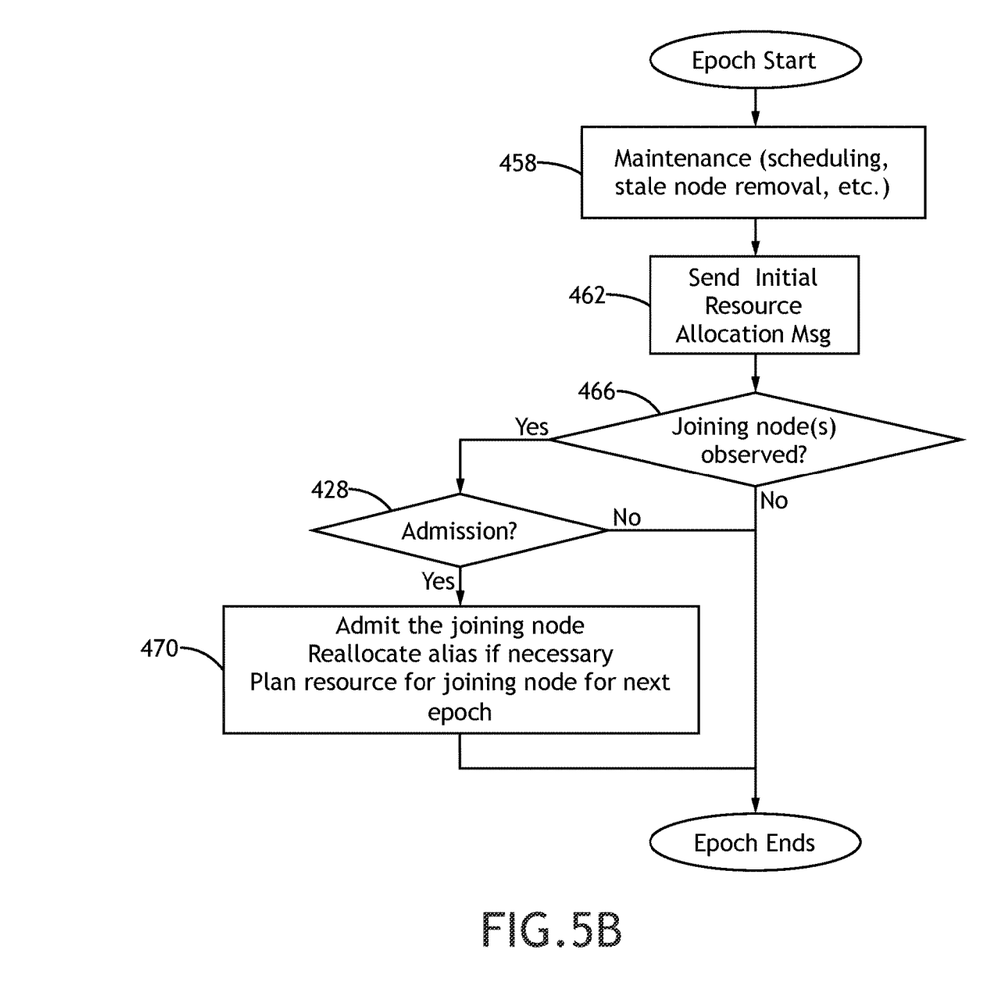
FIG. 5B is a flow diagram illustrating a method for maintaining the first base station of a first cell, in accordance with one or more embodiments of the disclosure.

FIG. 4B illustrates a method 450 for maintaining the first base station 104a of a first cell 102a, in accordance with one or more embodiments of the disclosure. One or more step of method 450 may configured as an extension of, or may be integrated into, method 400, and one or more steps of the method 450 is demonstrated in FIGS. 5A-B.

In some embodiments, the method 450 includes a step 454 of configuring the first base station (BS) 104a. For example, if step 404 determines that there is an absence of a first pilot signal, or if step 408 of method 400 determines that there is no first base station 104a configured for the first cell 102a, a node may then initiate becoming a base station 104a via the controller 140 of the node (e.g., utilizing the one or more processors 144 with instruction stored on the memory 148). The node may also receive other incoming instruction from other componentiv or devices within the communication system 100 to configured itself as the first base station 104a. If the node is not ready to configure as a first base station 104a, the node may wait until the next epoch to revisit, and decide to configure as a first base station 104a at a later date. Once the first base station 104a has been configured, the method 450 may further include a step of initiating the first cell 102a. For example, the first base station 104a perform procedures for initiating the cell structure and procedures to allow the joining of user equipment 108

In some embodiments, the method 450 includes a step 458 of performing maintenance on the first cell 102a. Cell maintenance may include at least one of generating or maintaining transmit schedules and removing stale nodes.

In some embodiments, the method 450 includes a step 462 of sending out an initial resource allocation message. The initial resource allocation message may include a request for one or more nodes in the area, asking if the one or more nodes want to join the first cell 102a as a user equipment 108. The initial resource allocation message may be delivered with generic receiver information, with not specifically targeted node.

In some embodiments, the method 450 includes a step 466 of monitoring the channel for a cell join request from a node and receiving the cell join request. For example, a node that is intended to be a user equipment 108 may send a cell join request to the first base station 104a that contains a first proposed alias. The first base station 104a may then determine if the first proposed alias is acceptable as described in step 428 of method 400.

In some embodiments, the method 450 further includes a step 470 of transmitting the admittance reply to the user equipment 108. Once admitted, the base station 104a may then begin sending the aliased resource allocation message 204 to the user equipment 108 in the current or subsequent epoch. In some embodiments, if the first proposed alias is not acceptable, as determined in step 428 of method 400, the method 450 will further include a step 474 of sending a recommended alias reply to the user equipment 108, as detailed herein. At this point, the first base station 104a may assume that the recommended alias is compatible with the user equipment 108 and will send an admittance reply to the user equipment 108 along with the recommended alias. The first base station 104a may alternatively wait for an answer to the recommended alias reply that the user equipment 108 has accepted the recommended alias before transmitting the admittance reply.

If multiple user equipment 108 attempt to join the first cell 102a having selected the same alias, causing a RACH collision, the first base station 104a may decide to not admit any of the multiple user equipment, and then transmit to the multiple user equipment in a subsequent resource allocation message 204 at least one of 1) a notification that a RACH collision has occurred 2) a notification that the user equipment 108 has not been admitted into the first cell 102a, 3) a notification that a new alias is requested, and 4) a recommended alias.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A method for joining a communication network comprising a first cell, comprising:
    monitoring a channel for a first pilot signal;
    determining the first pilot signal;
    determining a first base station associated with the first pilot signal;
    identifying a random-access channel procedure to communicate with the first base station;
    selecting a first proposed alias;
    transmitting a cell join request to the first base station via the random-access channel procedure for admittance into the first cell, wherein the join request comprises the first proposed alias;
    determining if the first proposed alias is acceptable via the first base station;
    receiving an admittance reply from the first base station, wherein the admittance reply is based on an acceptance of the first proposed alias or a recommended alias; and
    receiving a resource allocation message that includes the first proposed alias or the recommended alias.

2. The method of claim 1, wherein selecting the first proposed alias comprises:
    examining in-use aliases within the first cell;
    selecting an alias that is not in-use.

3. The method of claim 1, further comprising receiving a recommended alias reply from the first base station, wherein the recommended alias reply includes the recommended alias that is dissimilar to the proposed alias.

4. The method of claim 1, wherein determining if the first proposed alias is acceptable comprises;
    determining a number of bits required to transmit the first proposed alias; and
    selecting the recommended alias requiring fewer bits to transmit than the proposed alias if aliases with a lower bit count are available.

5. The method of claim 4, wherein determining if the first proposed alias is acceptable further comprises:
    comparing the first proposed alias to a set of aliases in-use within the first cell;
    determining that the first proposed alias is unique to the set of aliases in-use within the first cell.

6. The method of claim 1 further comprising transmitting a resource management message, wherein the resource management message comprises an aliased identification element configured to identify the first proposed alias or the recommended alias.

7. The method of claim 1, further comprising joining a second cell within the communication network, comprising:
    monitoring a channel for a second pilot signal for the second cell;
    receiving the second pilot signal;
    identifying a second base station associated with the second pilot signal;
    identifying the random-access channel procedure to communicate with the second base station;
    selecting a second proposed alias;
    transmitting a second cell join request to the second base station via the random-access channel procedure for admittance into the second cell, wherein the second cell join request comprises the second proposed alias;
    determining if the second proposed alias is acceptable via the second base station;
    receiving an admittance reply from the second base station; and
    receiving a resource allocation message that includes the second proposed alias.

8. The method of claim 7 further comprising transmitting a second resource management message, wherein the second resource management message comprises an aliased identification element configured to identify the first proposed alias, and the second proposed alias.

9. A method of claim 1, whereupon at least one of a determination of an absence of the first pilot signal or a determination of an absence of the first base station, the method further includes designating a node as the first base station.

10. The method of claim 9, further comprising:
    transmitting an initial resource allocation message;
    receiving the cell join request; and
    transmitting the admittance reply.

11. A communication system comprising:
    a plurality of communication nodes, wherein a first set of the plurality of communication nodes are arranged in a first cell containing one communication node configured as a base station and at least one communication node configured as a user equipment, the user equipment comprising:
        a first transmitter;
        a first receiver;
        one or more first processors; and
        a first memory communicatively coupled to the one or more first processors and having instructions stored upon, which when executed by the one or more first processors, causing the one or more first processors to:
            monitor a channel for a first pilot signal;
            determine the first pilot signal;

determine a first base station associated with the first pilot signal;
identify a random-access channel procedure to communicate with the first base station;
select a first proposed alias;
transmit a cell join request to the first base station via the random-access channel procedure for admittance into the first cell, wherein the join request comprises the first proposed alias;
receive an admittance reply from the first base station, wherein the admittance reply is based on an acceptance of the first proposed alias or a recommended alias; and
transmit a signal via a resource of a cell joining procedure.

12. The system of claim 11, wherein the base station comprises:
a second transmitter;
a second receiver;
one or more second processors; and
a second memory communicatively coupled to the one or more second processors and having second instructions stored upon, which when executed by the one or more second processors, causing the one or more second processors to:
determine at least one of an absence of the first pilot signal or an absence of the first base station;
designate a node as the first base station;
receive the cell join request;
determine if the first proposed alias is acceptable;
transmit the admittance reply.

13. The system of claim 11, wherein selecting the first proposed alias comprises:
examining in-use aliases within the first cell; and
selecting an alias that is not in-use.

14. The system of claim 12, wherein the determination that the first proposed alias is acceptable comprises:
comparing the first proposed alias to other aliases in-use within the first cell; and
determining that the first proposed alias is unique to the other aliases in-use within the first cell.

15. The system of claim 12, wherein the instructions stored upon the second memory further instruct the second one or more processors to maintain an alias table.

16. The system of claim 11 wherein a determination of the first proposed alias as acceptable comprises:
determining a number of bits required to transmit the proposed alias; and
selecting the recommended alias requiring fewer bits to transmit than the proposed alias if aliases with a lower bit count are available.

17. The system of claim 11, wherein the plurality of communication nodes comprises a second set of communication nodes arranged in a second cell containing a second base station, wherein the second cell includes at least one shared user equipment from the first cell, the shared user equipment configured with a second alias specific for the second cell.

18. The system of claim 17, wherein the at least one shared user equipment is configured to transmit a resource management message comprising an alias element, configured to identify the first proposed alias or the second alias, and a cell identification element configured to identify the first cell or the second cell.

19. The system of claim 12, wherein the instructions stored upon the second memory further instruct the second one or more processors to, upon two or more user equipment selecting a same alias, to:
refuse to admit the two or more-user equipment; and
report a random-access channel collision in a subsequent resource allocation message.

20. A method for joining an ad hoc communication network comprising a first cell, comprising:
selecting a first proposed alias;
transmitting a cell join request to a first base station via a random-access channel procedure for admittance into the first cell, wherein the join request comprises the first proposed alias;
determining if the first proposed alias is acceptable via the first base station;
receiving an admittance reply from the first base station, wherein the admittance reply is based on an acceptance of the first proposed alias or a recommended alias; and
receiving a resource allocation message that includes the alias.

* * * * *